US012088627B2

(12) United States Patent
Bharti et al.

(10) Patent No.: US 12,088,627 B2
(45) Date of Patent: Sep. 10, 2024

(54) SECURITY AND TASK PERFORMANCE VALIDATION FOR A COOPERATIVE DEVICE NETWORK (71) Applicant: International Business Machines Corporation, Armonk, NY (US)

(72) Inventors: Harish Bharti, Pune (IN); Rajesh Kumar Saxena, Maharashtra (IN); Anupam Gupta, Noida (IN); Sandeep Sukhija, Rajasthan (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 390 days.

(21) Appl. No.: 17/469,587

(22) Filed: Sep. 8, 2021

(65) Prior Publication Data
US 2023/0069938 A1    Mar. 9, 2023

(51) Int. Cl.
*H04L 12/24*    (2006.01)
*H04L 9/40*    (2022.01)
(Continued)

(52) U.S. Cl.
CPC .............. *H04L 63/20* (2013.01); *H04L 41/12* (2013.01); *H04L 41/122* (2022.05); *H04L 41/40* (2022.05); *H04L 63/12* (2013.01)

(58) Field of Classification Search
CPC ......... H04L 12/24; H04L 63/20; H04L 41/12; H04L 41/122; H04L 63/12; H04L 41/40
See application file for complete search history.

(56) References Cited

U.S. PATENT DOCUMENTS 11,637,708 B2 *   4/2023   Hung ............... H04L 9/3247
                                                    713/168
2013/0073858 A1 *  3/2013  Lim ................. H04L 9/007
                                                    713/176
(Continued)

FOREIGN PATENT DOCUMENTS

CN    108833087 B    *  4/2021   ............. H04L 63/06
KR    101938312 B1       1/2019
WO    WO-2011134608 A9 * 4/2012   ........... H04L 63/062

OTHER PUBLICATIONS

"Optimum Network Architecture for Full-Scale IoT"—NEC Corporation, Feb. 2016 https://uk.nec.com/en_GB/en/global/solutions/nsp/sc2/doc/wp_iot_nec.pdf (Year: 2016).*
(Continued)

*Primary Examiner* — Randy A Scott
(74) *Attorney, Agent, or Firm* — Garg Law Firm, PLLC; Rakesh Garg; Rakesh Roy (57) ABSTRACT A core set of nodes of a graph representing a network of devices is identified, a node of the graph representing a device in the network of devices, an edge of the graph representing an ability to transmit data between two devices represented by corresponding nodes of the graph. A device represented by a node more than one hop from any node in the core set of nodes of the graph is removed from the network of devices, the removing resulting in a validated network of devices. Using a number of devices in the validated network of devices, a number of security keys in use in the validated network is validated. A device in the validated network is caused to perform a task.

15 Claims, 7 Drawing Sheets (51) Int. Cl.
 *H04L 29/06*   (2006.01)
 *H04L 41/12*   (2022.01)
 *H04L 41/122*  (2022.01)
 *H04L 41/40*   (2022.01)

(56) References Cited

U.S. PATENT DOCUMENTS

| | | | |
|---|---|---|---|
| 2014/0269260 A1* | 9/2014 | Xue | H04L 45/22 |
| | | | 370/254 |
| 2015/0356305 A1* | 12/2015 | Volvovski | G06F 21/602 |
| | | | 713/164 |
| 2018/0041546 A1 | 2/2018 | Gomez et al. | |
| 2018/0191729 A1 | 7/2018 | Whittle et al. | |
| 2019/0132709 A1 | 5/2019 | Graefe et al. | |
| 2020/0366585 A1 | 11/2020 | Nainar et al. | |

OTHER PUBLICATIONS

"TACIoT: Multidimensional Trust-Aware Access Control System for the Internet of Things"—Bernabe et al, Springer-Verlag Berlin Heidelberg, May 15, 2015 https://link.springer.com/article/10.1007/s00500-015-1705-6 (Year: 2015).*

NEC Corporation, Optimum Network Architecture for Full-scale IoT, Feb. 2016.

Bernabe et al., TACIoT: multidimensional trust-aware access control system for the Internet of Things, May 15, 2015.

* cited by examiner

SECURITY AND TASK PERFORMANCE VALIDATION FOR A COOPERATIVE DEVICE NETWORK

BACKGROUND

The present invention relates generally to a method, system, and computer program product for management of a cooperative device network. More particularly, the present invention relates to a method, system, and computer program product for security and task performance validation for a cooperative device network.

An Internet of Things (IoT) device is a programmable device that includes a processor, memory, and the ability to communicate data to and from a network. An IoT device typically includes one or more sensors with which to collect data, and sometimes includes an ability to perform an action in response to collected data or a command received from the network. Some examples of IoT devices include thermostats (which collect temperature data and activate a heating or cooling system in response), light bulbs (which adjust lighting in response to detecting a person's presence or at a particular time), coffee machines (activated in response to a command, and with the ability to report a status such as needing to be refilled over a network), printers (receiving transmitted data and printing it), and the like.

IoT devices use a variety of methods to communicate data, mostly wirelessly, including, e.g., Ethernet, Wi-Fi, Zigbee, Bluetooth and related protocols, Long Term Evolution (LTE) and 5G cellular data communications, and others. Wi-Fi is a registered trademark of Wi-Fi Alliance in the United States and other countries. Zigbee is a registered trademark of Connectivity Standards Alliance Corp. in the United States and other countries. LTE is a registered trademark of Institut Européen des Normes; de Télécommunication Association in the United States and other countries. Bluetooth is a registered trademark of Bluetooth SIG, Inc. in the United States and other countries. Some IoT devices connect directly to a network such as the Internet, for example using Wi-Fi. Some IoT devices transmit data to each other using mesh networking, for example using the Zigbee protocol. In a mesh network, one or more pathways connect each node, and connections between nodes are dynamically updated and optimized using a mesh routing table. Mesh networks are decentralized, and each node is capable of self-discovery on the network. As nodes leave the network, the mesh topology allows the nodes to reconfigure routing paths based on the new network structure. Software within each node implements joining a network and a security implementation.

IoT devices that implement a security method typically use either centralized security, in which a coordinator device or other entity forms the network and manages the allocation of network and link security keys to joining nodes, or distributed security, in which there is no coordinator and any device in the network can provide a key to another device joining the network.

SUMMARY

The illustrative embodiments provide a method, system, and computer program product. An embodiment includes a method that identifies a core set of nodes of a graph representing a network of devices, a node of the graph representing a device in the network of devices, an edge of the graph representing an ability to transmit data between two devices represented by corresponding nodes of the graph. An embodiment removes, from the network of devices, a device represented by a node more than one hop from any node in the core set of nodes of the graph, the removing resulting in a validated network of devices. An embodiment validates, using a number of devices in the validated network of devices, a number of security keys in use in the validated network. An embodiment causes performance, by a device in the validated network, of a task.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that some networks are obligatory, i.e. every IoT device in the network is obliged to respond in a predefined manner to a particular event. Such networks are optimized for a particular response time to a particular event. However, if the optimized-for event rarely happens, devices on the network might be idle when they could be used for another purpose. On the other hand, if the optimized-for event occurs more often than expected or requires more device resources (e.g. processing speed or memory space) to process than expected, additional devices cannot easily be deployed to assist an overloaded device.

Thus, the illustrative embodiments recognize that a more flexible device network implementation uses a non-obligatory, or cooperative, network, in which a set of IoT devices are assembled, or assemble themselves, into a network configured to perform a specific task and perform that task. Once the task is completed, or if the task changes, the network is disassembled or reconfigured accordingly, and devices that are no longer needed for one task can be repurposed for a different task. However, when configuring a cooperative network, the network must include enough participating devices, with sufficient processing ability, to perform the task, with sufficient connectivity to other participating devices to communicate the task and any resulting data to a specified destination. Consequently, the illustrative embodiments also recognize that there is an unmet need to validate that the network includes enough participating devices, with sufficient processing ability and sufficient connectivity to perform the task.

In addition, there is a need to validate, and optionally adjust, the number of secret keys used to encrypt inter-device communications on the network according to the number of devices and connectivity of the network. If there are only a few secret keys, devices are more likely to share a key and thus be able to connect to each other, but only a few keys need be compromised to render the entire network insecure. Conversely, if there are more secret keys, more keys need be compromised, but fewer devices are likely to share a key, so connectivity suffers.

The illustrative embodiments recognize that the presently available tools or solutions do not address these needs or provide adequate solutions for these needs. The illustrative embodiments used to describe the invention generally address and solve the above-described problems and other problems related to security and task performance validation for a cooperative device network.

An embodiment can be implemented as a software application. The application implementing an embodiment can be configured as a modification of an existing IoT device networking system, as a separate application that operates in conjunction with an existing IoT device networking system, a standalone application, or some combination thereof.

Particularly, some illustrative embodiments provide a method that constructs a graph corresponding to a network, identifies a core set of nodes of the graph, removes from the network any device that corresponds to a graph node more than one hop from any node in the core set of nodes, validates the number of security keys, and uses the validated network, secured by the validated number of security keys, to perform a task.

An embodiment receives information about a network of IoT devices, including which devices are connected to which other devices in the network. One embodiment executes in a coordinator device managing the network, including allocation of network and link security keys to joining nodes. Another embodiment executes in any device in the network that can provide a key to another device joining the network. In one embodiment, the information includes capability information about one or more devices in the network. Some non-limiting examples of capability information are a processing speed of a processor in a device, a memory size of a memory in a device, and information regarding the capabilities of one or more sensors installed in a device.

An embodiment constructs a graph representing to the network of IoT devices. A node of the graph represents an IoT device in the network, and an edge of the graph, connecting two graph nodes, represents an ability to transmit data between two devices represented by the nodes. Techniques for constructing a graph representing a network of devices are presently known.

An embodiment identifies a core set, or group, of nodes within the graph. A node within the core set of nodes has at least a threshold number of links to other nodes. In one embodiment, the threshold number is three, and any node with three or more links to other nodes is included in the core set of nodes. In another embodiment, the threshold number is four. Other threshold numbers are also possible and contemplated within the scope of the illustrative embodiments.

An embodiment removes from the network any device that corresponds to a graph node more than one hop, or edge, from any node in the core set of nodes, generating a validated network. Removed devices and corresponding nodes are not considered during network routing establishment. To identify nodes more than one hop away from any node in the core set of nodes, one embodiment starts from a node in the core set, and recursively explores the graph along each edge emanating from that node. During the exploration, the embodiment adds any nodes that are more than one hop away from any node in the core set to a set, or list, of nodes to be removed. The embodiment then removes from the network any device that corresponds to a graph node in the set of nodes to be removed. A network with such devices removed has sufficient connectivity that a route from one device to another device includes an optimal number of hops. Other node identification and removal methods are also possible and contemplated within the scope of the illustrative embodiments.

An embodiment validates the number of security keys. For a network with the characteristics of a validated network, the number of security keys relative to the total number of possible security keys and the number of devices in the network can be expressed using $s^2\ p=\ln(N)/N$, where s denotes the number of secret keys to be used, p denotes the number of possible secret keys, and N denotes the number of devices in the validated network. If s, the number of secret keys, is approximately equal to the square root of the number of devices, and p is set according to the expression, the resulting network is provably resilient and connected with high probability but not essentially more secure than a network with a larger number of secret keys. If s is approximately equal to log N the square root of the number of devices, setting p according to the expression minimizes the key size, which can be especially important in devices with little memory with which to decrypt data using a key, such as sensors. If the number of security keys is lower than a threshold value determined using these expressions, an embodiment generates, or causes to be generated, additional security keys for use within the network. If the number of security keys is higher than a second threshold value determined using these expressions, an embodiment withdraws, or causes to be withdrawn, one or more security keys used within the network. If two devices were using a withdrawn security key, the embodiment reestablishes connectivity or causes connectivity to be reestablished between the two devices using a security key that was not withdrawn.

An embodiment uses the validated network, secured by the validated number of security keys, to perform a task or cause performance of a task. To perform a task or cause performance of a task, one embodiment relays task data from one IoT device in the validated network to one or more other IoT devices in the network. One or more of the IoT devices receives the task data and performs the task. If there is result data resulting from performance of the task, an embodiment relays the result data between devices in the network as well. Another embodiment uses available capability information for one or more devices within the network to determine whether the validated network is capable of performing a task, and performs the task only if the validated network is capable.

The manner of security and task performance validation for a cooperative device network described herein is unavailable in the presently available methods in the technological field of endeavor pertaining to device networking. A method of an embodiment described herein, when implemented to execute on a device or data processing system, comprises substantial advancement of the functionality of that device or data processing system in constructing a graph corresponding to a network, identifying a core set of nodes of the graph, removing from the network any device that corresponds to a graph node more than one hop from any node in the core set of nodes, validating the number of security keys, and using the validated network, secured by the validated number of security keys, to perform a task.

The illustrative embodiments are described with respect to certain types of contents, transmissions, delays, events, climactic events, non-climactic events, periods, forecasts, thresholds, validations, responses, rankings, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
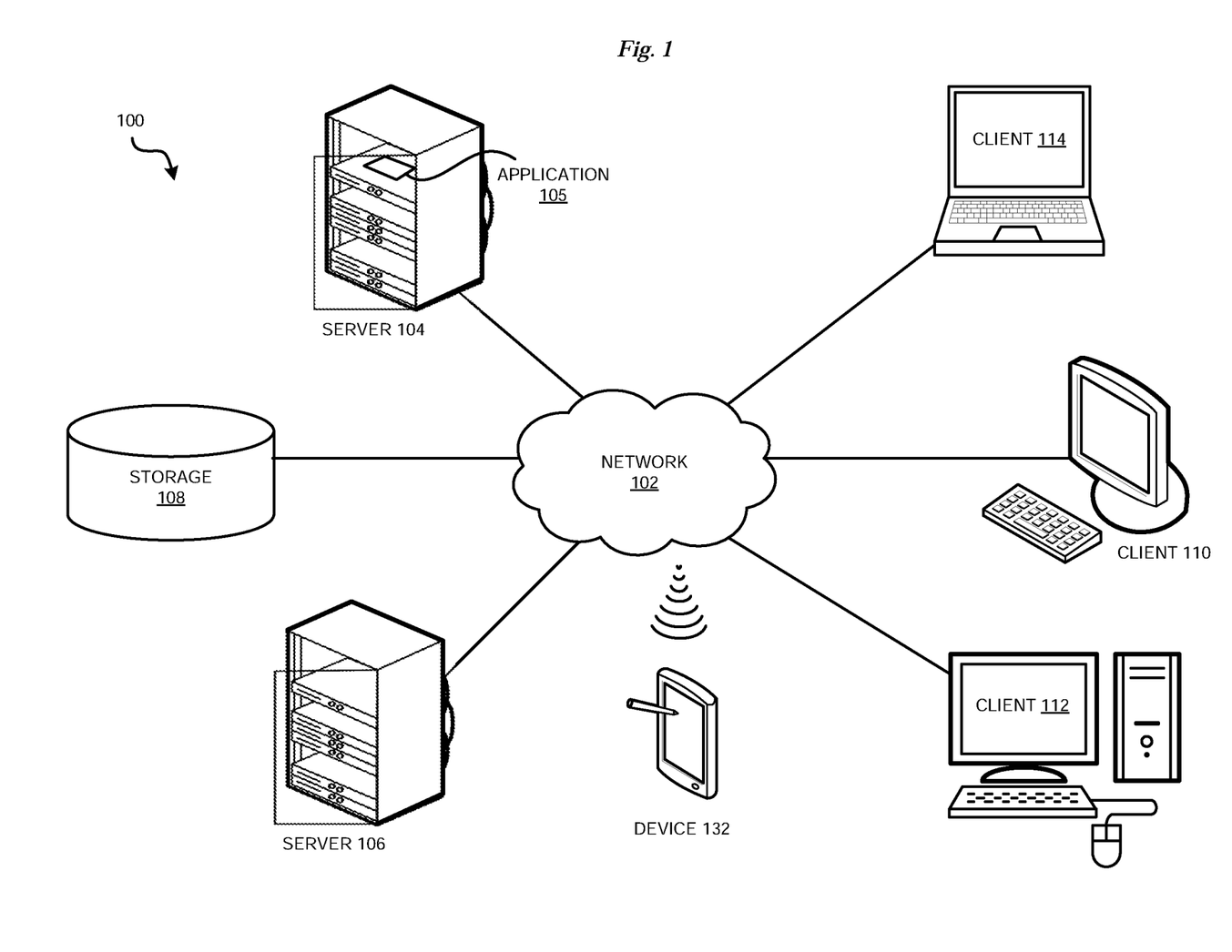
FIG. 1 depicts a block diagram of a network of data processing systems in which illustrative embodiments may be implemented.
Figure 2:
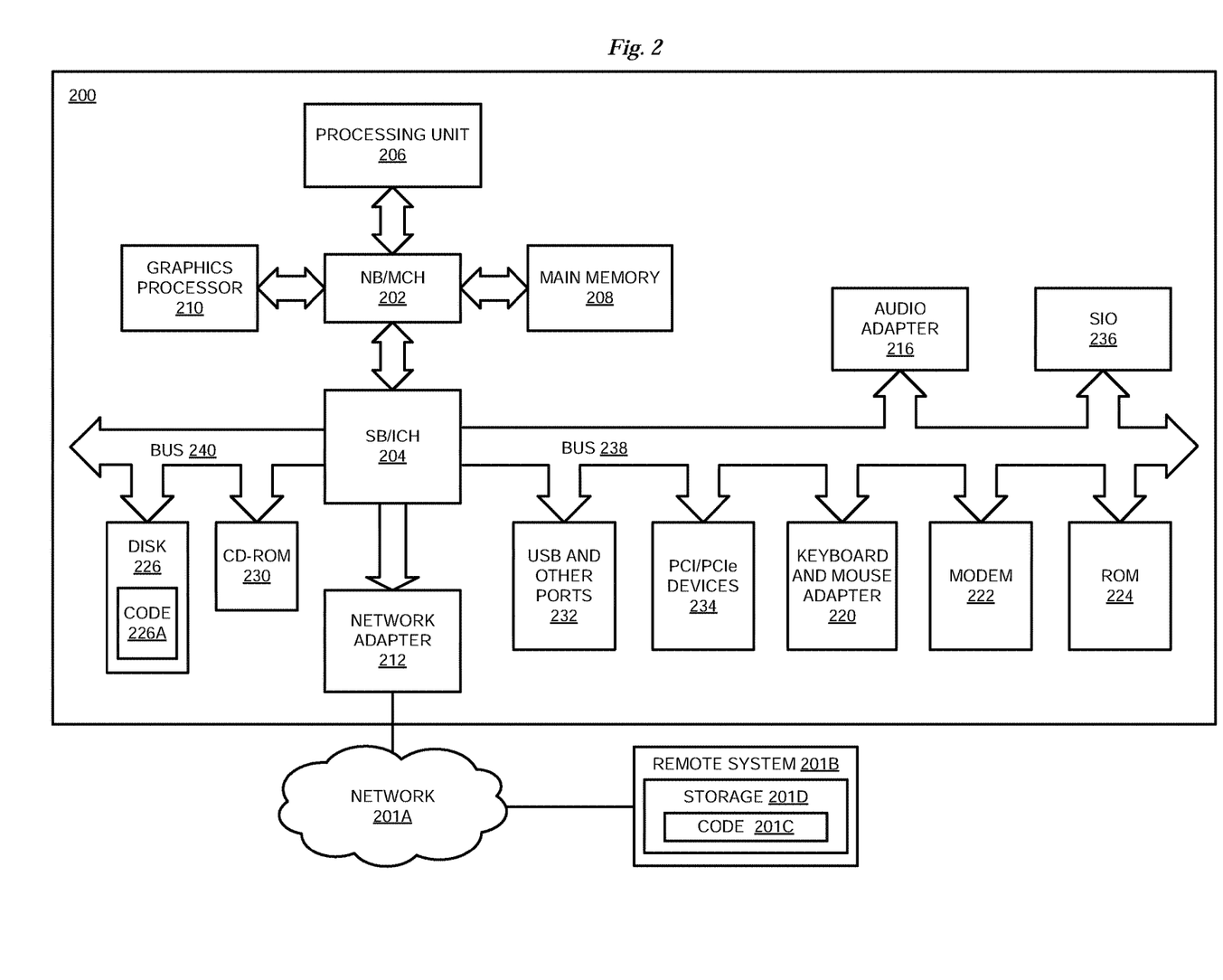
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, an IoT device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Device 132 optionally includes a sensor (not shown) usable in performance of a task. Multiple instances of device 132 can also comprise a network of IoT devices as described herein, coupled via network 102 or another networking method.

Application 105 implements an embodiment described herein. Application 105 executes in any of servers 104 and 106, clients 110, 112, and 114, device 132, and multiple instances of device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
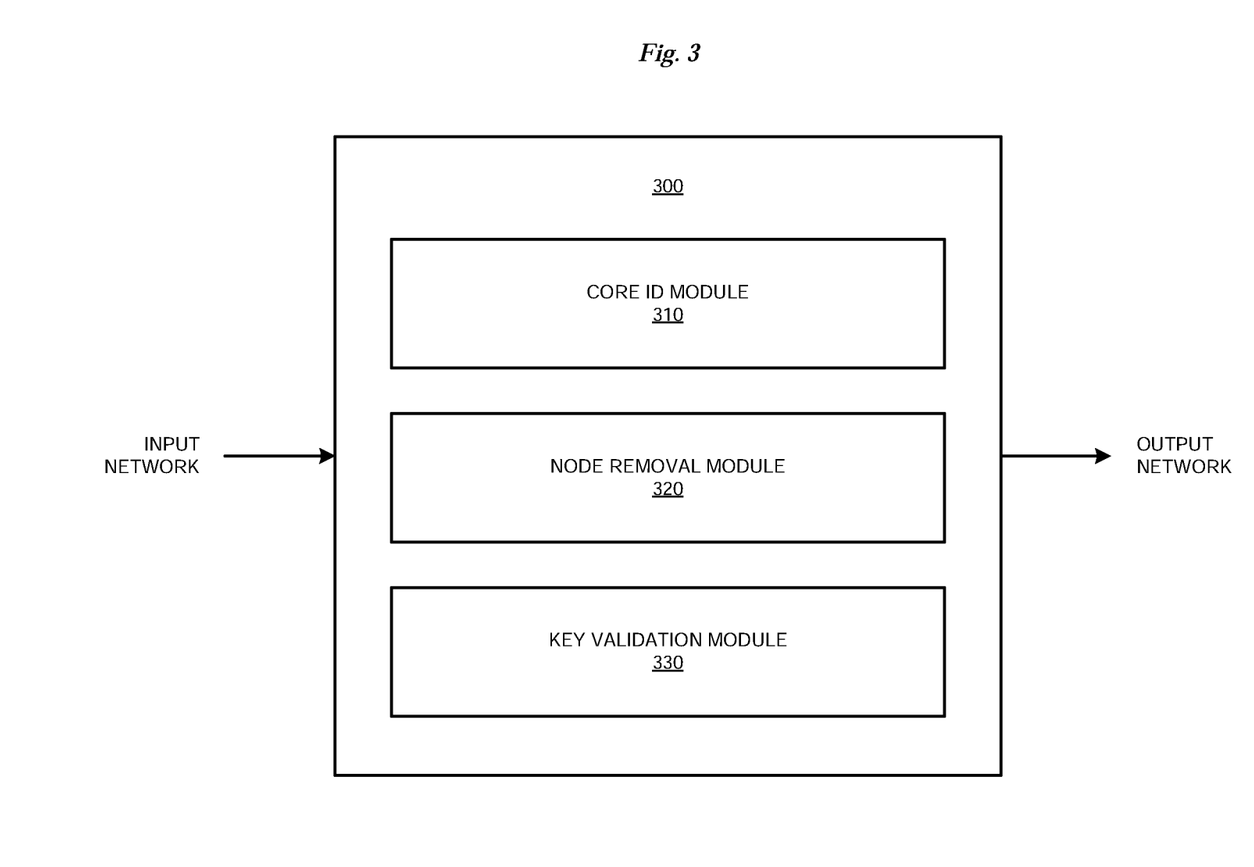
FIG. 3 depicts a block diagram of an example configuration for security and task performance validation for a cooperative device network in accordance with an illustrative embodiment.

With reference to FIG. 3, this figure depicts a block diagram of an example configuration for security and task performance validation for a cooperative device network in accordance with an illustrative embodiment. Application 300 is an example of application 105 in FIG. 1 and executes in any of servers 104 and 106, clients 110, 112, and 114, and device 132 in FIG. 1.

Application 300 receives information about a network of IoT devices, including which devices are connected to which other devices in the network. One implementation of application 300 executes in a coordinator device managing the network, including allocation of network and link security keys to joining nodes. Another implementation of application 300 executes in any device in the network that can provide a key to another device joining the network. The information optionally includes capability information about one or more devices in the network, such as a processing speed of a processor in a device, a memory size of a memory in a device, and information regarding the capabilities of one or more sensors installed in a device.

Application 300 constructs a graph representing to the network of IoT devices. A node of the graph represents an IoT device in the network, and an edge of the graph, connecting two graph nodes, represents an ability to transmit data between two devices represented by the nodes.

Core identification module 310 identifies a core set, or group, of nodes within the graph. A node within the core set of nodes has at least a threshold number of links to other nodes. In one implementation of module 310, the threshold number is three, and any node with three or more links to other nodes is included in the core set of nodes. In another implementation of module 310, the threshold number is four.

Node removal module 320 removes from the network any device that corresponds to a graph node more than one hop, or edge, from any node in the core set of nodes, generating a validated network. To identify nodes more than one hop away from any node in the core set of nodes, module 320 starts from a node in the core set, and recursively explores the graph along each edge emanating from that node. During the exploration, module 320 adds any nodes that are more than one hop away from any node in the core set to a set, or list, of nodes to be removed. Module 320 then removes from the network any device that corresponds to a graph node in the set of nodes to be removed.

Key validation module 330 validates the number of security keys. If the number of security keys is lower than a threshold value, module 330 generates, or causes to be generated, additional security keys for use within the network. If the number of security keys is higher than a second threshold value determined using these expressions, module 330 withdraws, or causes to be withdrawn, one or more security keys used within the network. If two devices were using a withdrawn security key, module 330 reestablishes connectivity or causes connectivity to be reestablished between the two devices using a security key that was not withdrawn.

Application 300 uses the validated network, secured by the validated number of security keys, to perform a task or cause performance of a task. To perform a task or cause performance of a task, application 300 relays task data from one IoT device in the validated network to one or more other IoT devices in the network. One or more of the IoT devices receives the task data and performs the task. If there is result data resulting from performance of the task, application 300 relays the result data between devices in the network as well. Another implementation of application 300 uses available capability information for one or more devices within the network to determine whether the validated network is capable of performing a task, and performs the task only if the validated network is capable.

Figure 4:
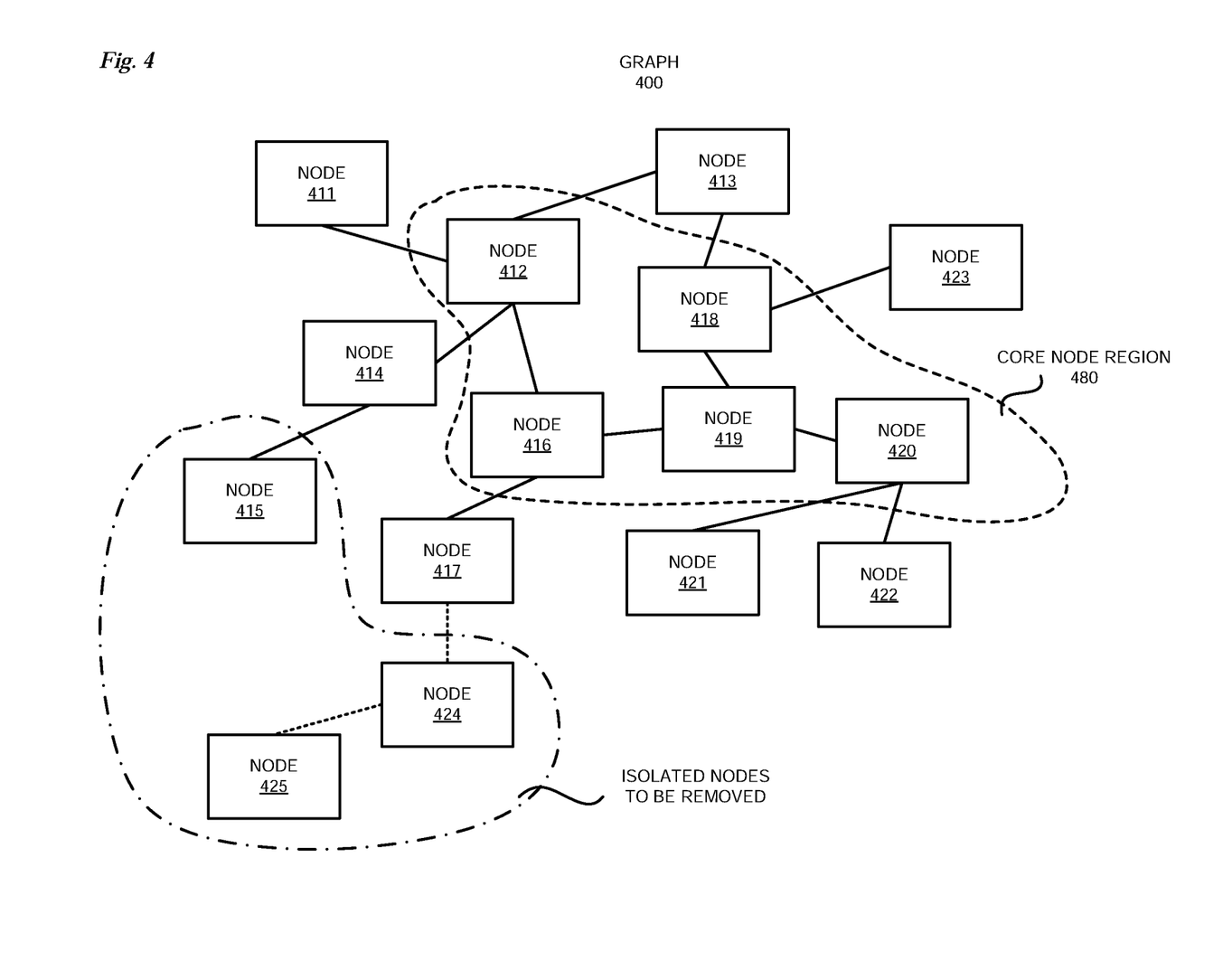
FIG. 4 depicts an example of security and task performance validation for a cooperative device network in accordance with an illustrative embodiment.

With reference to FIG. 4, this figure depicts an example of security and task performance validation for a cooperative device network in accordance with an illustrative embodiment. Application 300 is an example of application 105 in FIG. 1 and executes in any of servers 104 and 106, clients 110, 112, and 114, and one or more devices 132 in FIG. 1.

As depicted, graph 400 is a graph representing a network of devices 132. Graph 400 includes nodes 411-425, each representing an instance of device 132 in the network of devices 132. A link, or edge, between two graph nodes represents an ability to transmit data between two devices 132. Nodes within core node region 480 have been identified as within the core set of nodes of graph 400. Nodes 415, 424, and 425 are more than one hop from any node in core node region 480, and are being removed from the network represented by the graph.

Figure 5:
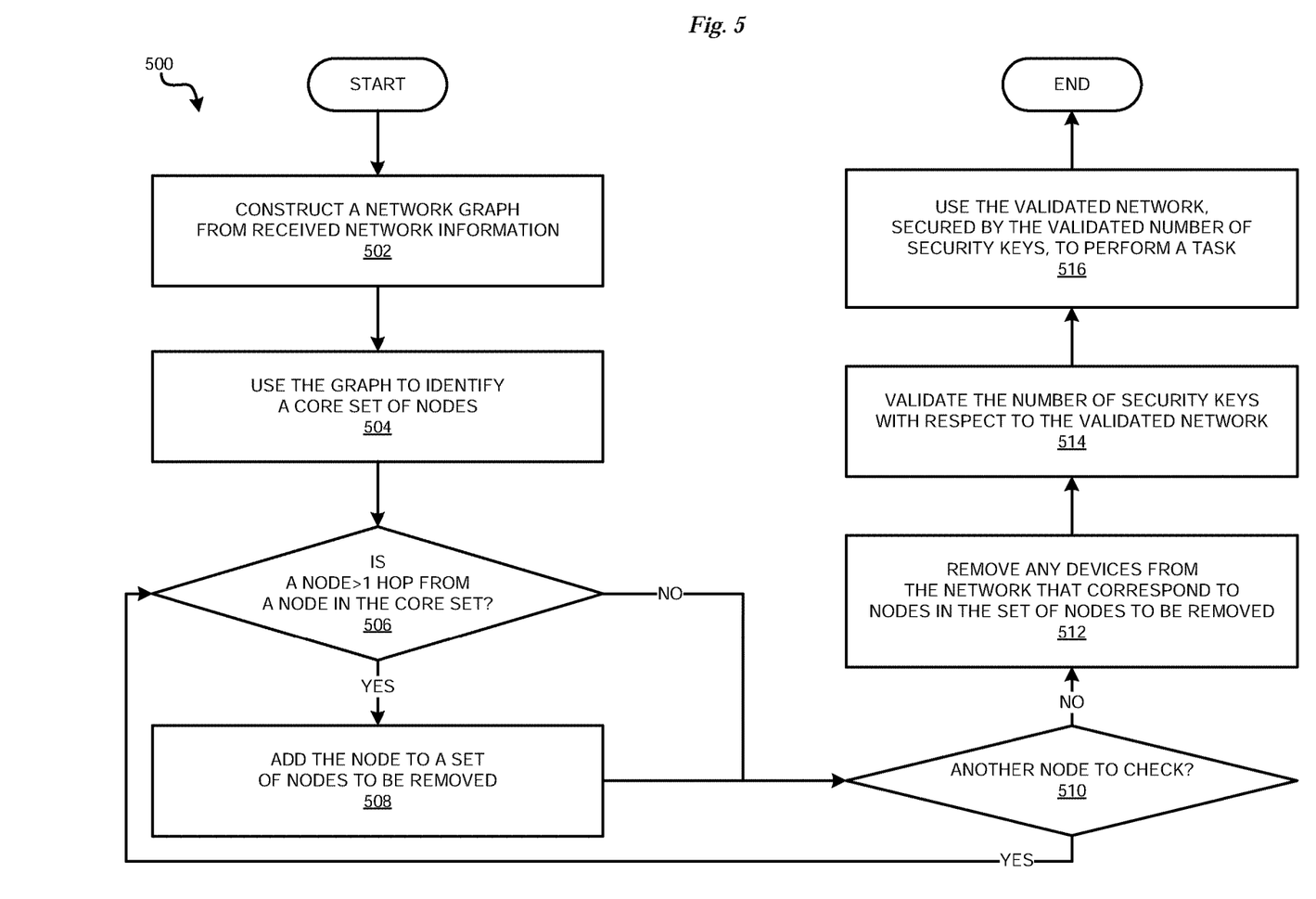
FIG. 5 depicts a flowchart of an example process for security and task performance validation for a cooperative device network in accordance with an illustrative embodiment.

With reference to FIG. 5, this figure depicts a flowchart of an example process for security and task performance validation for a cooperative device network in accordance with an illustrative embodiment. Process 800 can be implemented in application 300 in FIG. 3.

In block 502, the application constructs a network graph from received network information. In block 502, the application In block 504, the application uses the graph to identify a core set of nodes. In block 506, the application determines whether a node is greater than one hop from a node in the core set. If yes ("YES" path of block 506), in block 508, the application ADDs THE NODE TO A SET OF NODES TO BE REMOVED. In either case, in block 510, the application determines whether another node is to be checked. If yes ("YES" path of block 510), the application returns to block 506. Otherwise ("NO" path of block 510), in block 512 the application removes any devices from the network that correspond to nodes in the set of nodes to be removed. In block 514, the application validates the number of security keys with respect to the validated network. In block 516, the application uses the validated network, secured by the validated number of security keys, to perform a task. Then the application ends.

Figure 6:
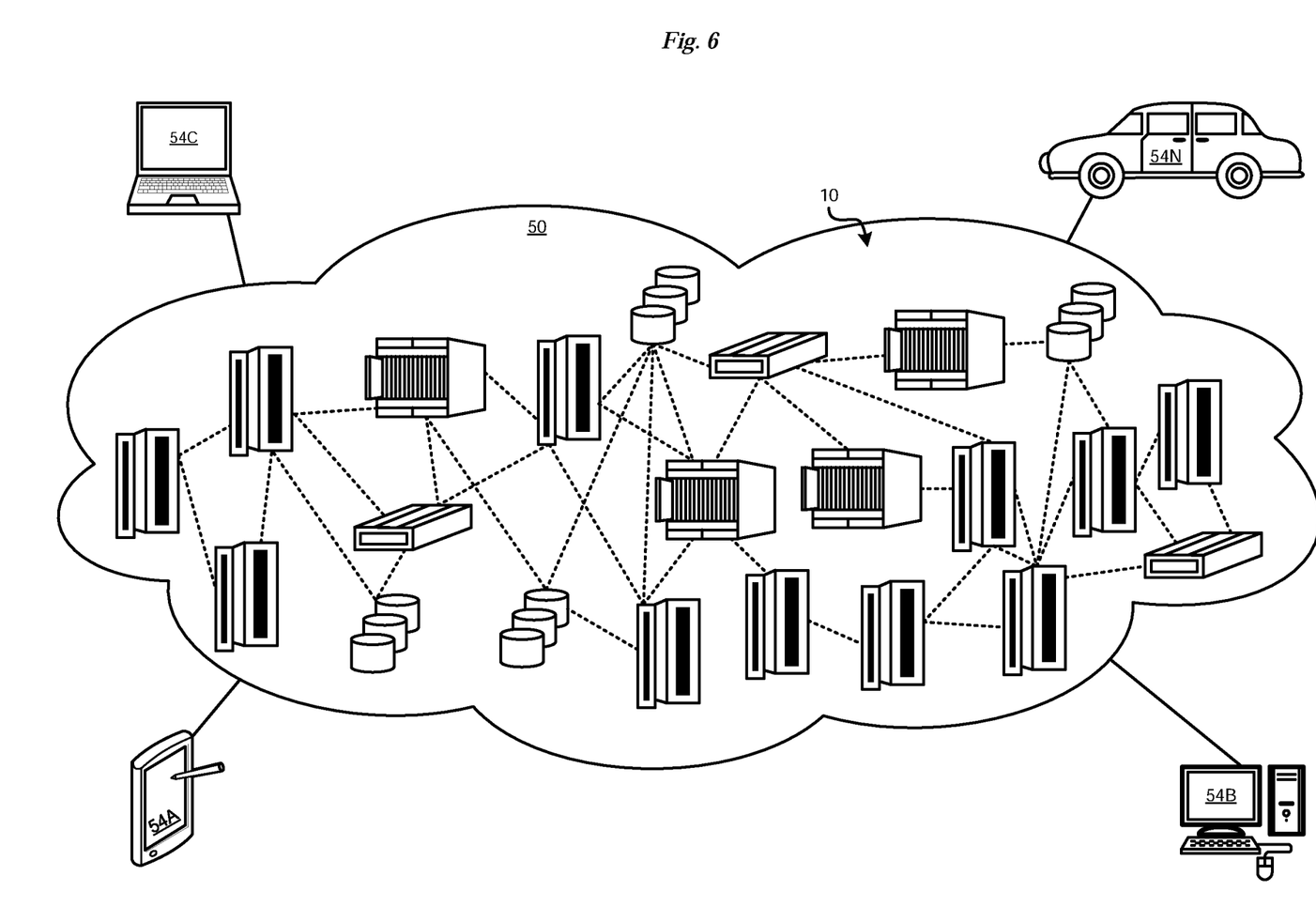
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 7:
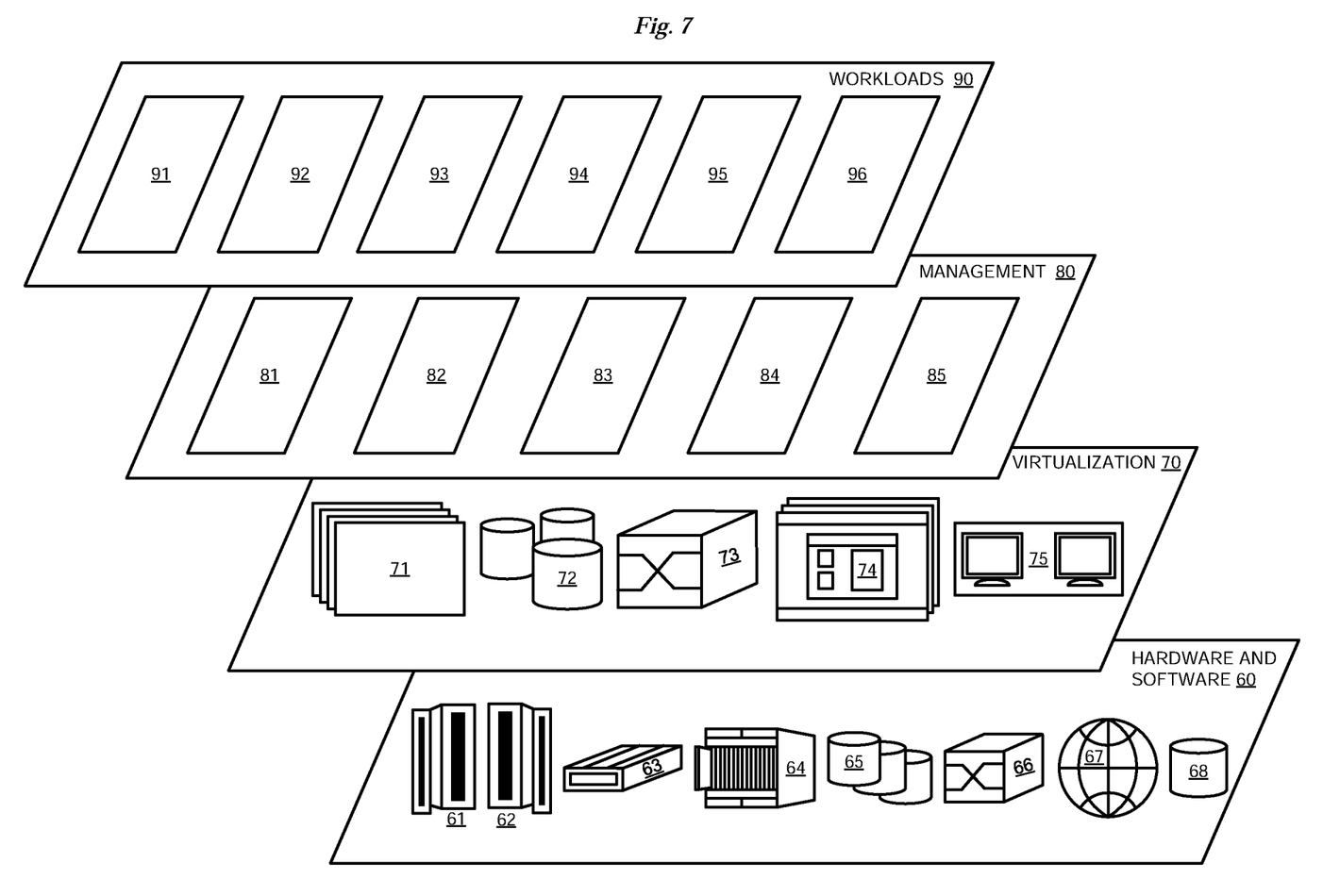
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for security and task performance validation for a cooperative device network and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    identifying a core set of nodes of a graph representing a network of devices, a node of the graph representing a device in the network of devices, an edge of the graph representing an ability to transmit data between two devices represented by corresponding nodes of the graph;
    removing, from the network of devices, a device represented by a node more than one hop from any node in the core set of nodes of the graph, the removing resulting in a validated network of devices;
    validating, upon determining how many devices are in the validated network of devices, a quantity of security keys authorized for concurrent use in the validated network;
    generating, responsive to the validating determining that the quantity of security keys in use in the validated network is lower than a threshold, one or more additional security keys, the quantity of additional security keys selected to render a total quantity of security keys equal to the threshold;
    determining, prior to causing performance of a task, using capability information of a device in the validated network, that the validated network is capable of performing the task; and
    causing performance, by a device in the validated network, of the task.

2. The computer-implemented method of claim 1, further comprising:
    constructing, from device information received at a device in the network of devices, the graph.

3. The computer-implemented method of claim 1, wherein the core set of nodes comprises a node having three or more links to another node.

4. The computer-implemented method of claim 1, further comprising:
    withdrawing, responsive to the validating determining that the quantity of security keys in use in the validated network is higher than a threshold, one or more withdrawn security keys, the quantity of withdrawn security keys selected to render the total quantity of security keys equal to the threshold.

5. A computer program product for cooperative device network validation, the computer program product comprising:
    one or more computer readable storage media, and program instructions collectively stored on the one or more computer readable storage media, the program instructions comprising:
        program instructions to identify a core set of nodes of a graph representing a network of devices, a node of the graph representing a device in the network of devices, an edge of the graph representing an ability to transmit data between two devices represented by corresponding nodes of the graph;

program instructions to remove, from the network of devices, a device represented by a node more than one hop from any node in the core set of nodes of the graph, the removing resulting in a validated network of devices;

program instructions to validate, based on how many devices are in the validated network of devices, a quantity of security keys authorized for concurrent use in the validated network;

program instructions to generate, responsive to the validating determining that the quantity of security keys in use in the validated network is lower than a threshold, one or more additional security keys, the quantity of additional security keys selected to render a total quantity of security keys equal to the threshold;

program instructions to determine, prior to causing performance of a task, using capability information of a device in the validated network, that the validated network is capable of performing the task; and program instructions to cause performance, by a device in the validated network, of the task.

6. The computer program product of claim 5, the stored program instructions further comprising:

program instructions to construct, from device information received at a device in the network of devices, the graph.

7. The computer program product of claim 5, wherein the core set of nodes comprises a node having three or more links to another node.

8. The computer program product of claim 5, the stored program instructions further comprising:

program instructions to withdraw, responsive to the validating determining that the quantity of security keys in use in the validated network is higher than a threshold, one or more withdrawn security keys, the quantity of withdrawn security keys selected to render the total quantity of security keys equal to the threshold.

9. The computer program product of claim 5, wherein the stored program instructions are stored in the at least one of the one or more storage media of a local data processing system, and wherein the stored program instructions are transferred over a network from a remote data processing system.

10. The computer program product of claim 5, wherein the stored program instructions are stored in the at least one of the one or more storage media of a server data processing system, and wherein the stored program instructions are downloaded over a network to a remote data processing system for use in a computer readable storage device associated with the remote data processing system.

11. The computer program product of claim 5, wherein the computer program product is provided as a service in a cloud environment.

12. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to identify a core set of nodes of a graph representing a network of devices, a node of the graph representing a device in the network of devices, an edge of the graph representing an ability to transmit data between two devices represented by corresponding nodes of the graph;

program instructions to remove, from the network of devices, a device represented by a node more than one hop from any node in the core set of nodes of the graph, the removing resulting in a validated network of devices;

program instructions to validate, based on how many devices are in the validated network of devices, a quantity of security keys authorized for concurrent use in the validated network;

program instructions to generate, responsive to the validating determining that the quantity of security keys in use in the validated network is lower than a threshold, one or more additional security keys, the quantity of additional security keys selected to render a total quantity of security keys equal to the threshold;

program instructions to determine, prior to causing performance of a task, using capability information of a device in the validated network, that the validated network is capable of performing the task; and program instructions to cause performance, by a device in the validated network, of the task.

13. The computer system of claim 12, the stored program instructions further comprising:

program instructions to construct, from device information received at a device in the network of devices, the graph.

14. The computer system of claim 12, wherein the core set of nodes comprises a node having three or more links to another node.

15. The computer system of claim 12, the stored program instructions further comprising:

program instructions to withdraw, responsive to the validating determining that the quantity of security keys in use in the validated network is higher than a threshold, one or more withdrawn security keys, the quantity of withdrawn security keys selected to render the total quantity of security keys equal to the threshold.

* * * * *